United States Patent Office 3,705,179
Patented Dec. 5, 1972

3,705,179
ANTIANDROGENIC STEROIDS
David J. Marshall, Hampstead, and Morris L. Givner, Pierrefonds, Quebec, Canada, assignors to American Home Products Corporation, New York, N.Y.
No Drawing. Filed Mar. 15, 1971, Ser. No. 124,556
Int. Cl. C07c 173/10, 169/20
U.S. Cl. 260—349
25 Claims

ABSTRACT OF THE DISCLOSURE

Compounds of the formula

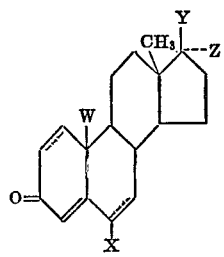

in which the dotted lines at positions 1,2 and 6,7 of the steroid nucleus designate optional double bonds, W is hydrogen or methyl, X is hydrogen, methyl, fluorine, chlorine or bromine, Y is carbonitrile, carboxaldehyde or isocarbonitrile and Z is hydrogen or methyl with the provisos that when an optional double bond is present at position 1,2 W is methyl and that when Y is carbonitrile or carboxaldehyde Z is methyl. The comopunds possess antiandrogenic activity rendering them useful for the treatment of androgen-dependent diseases.

BACKGROUND OF THE INVENTION

This invention relates to steroid carbonitriles carboxaldehydes, and isocarbonitriles, to processes used for their preparation and to intermediates used in these processes. Although examples of steroid carbonitriles, carboxaldehydes and isocarbonitriles have previously been described, they are generally viewed to be useful only as chemical intermediates. For example, 3β-hydroxyandrosta-5,16-diene-17-carbonitrile has been used as an intermediate in the synthesis of progesterone, see A. Butenandt and J. Schmidt-Thomé, Ber. 72, 182 (1939). It is the purpose of this invention to disclose new steroid carboxaldehydes, carbonitriles and isocarbonitriles possessing useful antiandrogenic properties without eliciting undesirable side effects.

These properties render the steroid carbonitriles, carboxaldehydes and isocarbonitriles of this invention useful as agents for the treatment of diseases which are affected by androgens. Such diseases include hirsutism, acne and precocious puberty.

SUMMARY OF THE INVENTION

The carbonitriles, carboxaldehydes, and isocarbonitriles of this invention are represented by general Formula 1,

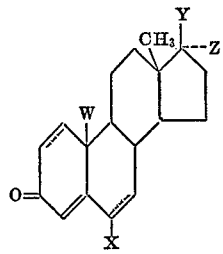

in which the dotted lines at positions 1,2 and 6,7 of the androstane nucleus designate optional double bonds which may be present at either of these positions; W represents hydrogen or methyl with the proviso that when a double bond is present at position 1,2 then W is methyl; X represents hydrogen, methyl, fluorine, chlorine or bromine; Y represents carbonitrile, carboxaldehyde, or isocarbonitrile; and Z represents hydrogen or methyl with the proviso that when Y is carbonitrile or carboxaldehyde Z is methyl.

Preferred compounds of this invention are compounds having the following formulae:

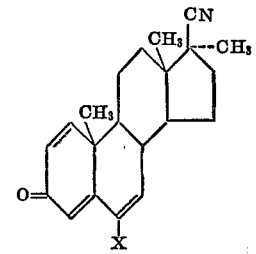

2

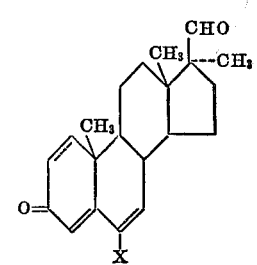

3

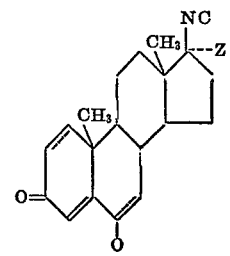

4

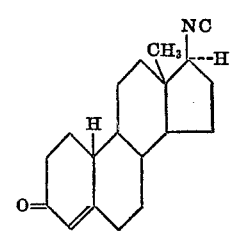

5 in which the dotted lines at positions 1,2 and 6,7, X and Z have the same significance as described above and Q is hydrogen, fluorine, chlorine or bromine.

DETAILED DESCRIPTION OF THE INVENTION

The carbonitriles, carboxaldehydes, and isocarbonitriles of this invention are valuable antiandrogenic agents.

Several androgen-dependent disease states exist which are affected by androgens. Such disease states include hirsutism, acne and precocious puberty. In these cases, it is generally accepted that the lowering of the levels of endogenous androgens by inhibiting androgen biosynthesis is desirable.

The inhibitory effect on androgen biosynthesis of the compounds of this invention may be demonstrated in biochemical or pharmacological tests. For example, the test for determining the inhibitory effect of compounds on the biosynthesis of gonadal hormones, described by M. L. Givner, G. Schilling and D. Dvornik, Endocrinol, 83, 984 (1968), or a modification thereof, may be used.

Furthermore, this inhibitory effect on androgen biosynthesis may be further demonstrated by administering the compounds of this invention to intact rats or to hypophysectiomized rats treated simultaneously with human chorionic gonadotropin. For example, injection of 17-methyl-3-oxoandrost - 4 - ene - 17β - carbonitrile, 100 mg./kg., for 29 days, to intact male rats resulted in significant decreases in the weights of androgen-dependent organs such as ventral prostate, seminal vesicles and levator ani, with no undesirable effect on adrenal weights.

Other pharmacologic tests may also be used to demonstrate the antiandrogenic properties of the compounds of this invention. For example, compounds of general Formulae 4 and 5 show potent antiandrogenic properties when evaluated for this effect in the test described by C. Revesz and C. I. Chappel, J. Reprod. Fert., 12, 473 (1966).

An interesting aspect of this invention is the regularity with which the presence of a 17-methyl group in the structure of the compounds of this invention imparts a surprisingly greater degree of antiandrogenic activity to the compound as compared to the corresponding derivative without the 17-methyl group. For example, in the test system of Givner, Schilling and Dvornik, cited above, 17 - methyl - 3 - oxoandrost - 4 - ene - 17β - carbonitrile, a compound of this invention, was found to be more than ten times as active as the known 3-oxoandrost-4-ene-17β-carbonitrile described by F. Sorm and V. Cerny, Chem. Listy, 46, 429 (1952).

When the compounds of this invention are employed as antiandrogenic agents in warm-blooded animals, e.g. rats, alone or in combination with pharmacologically acceptable carriers, the proportion of the compound is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 10 mg. to about 500 mg. per kg. per day; although, as mentioned above, variations will occur. However, a dosage level that is in the range of from about 50 mg. to about 250 mg. per kg. per day is most desirably employed in order to achieve effective results.

In practising this invention the compounds of Formula 2 in which X represents hydrogen are prepared by a process illustrated by the following formulae:

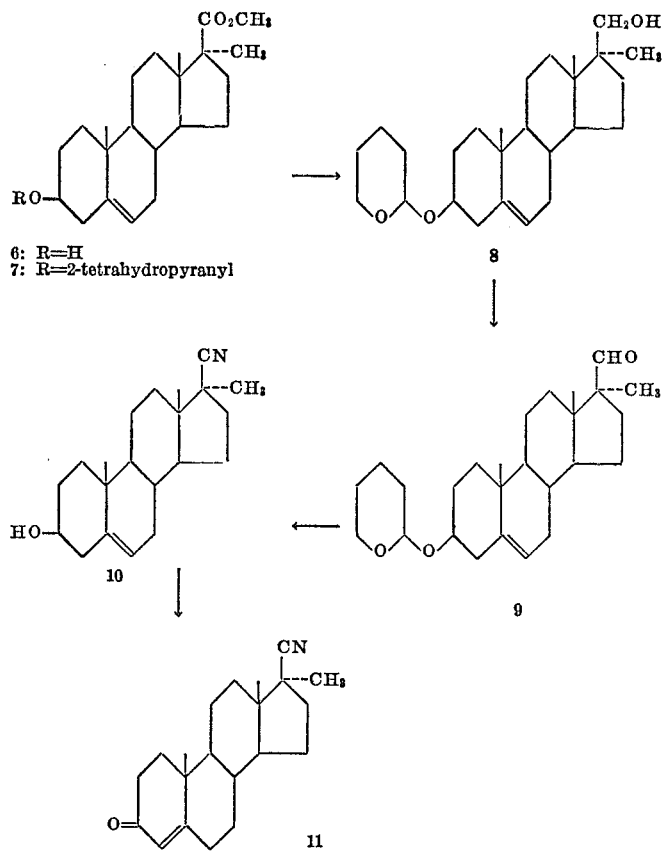

In the above process the starting material of Formula 6, methyl 3β-hydroxy-17-methylandrost-5-ene-17β-carboxylate, described by H. Heusser et al., Helv. Chim. Acta, 33, 2229 (1950), is converted to its corresponding 3β-(2-tetrahydropyranyl)ether derivative 7 by reaction with 2,3-dihydropyran in the presence of a strong acid catalyst, for example, p-toluenesulfonic acid. The derivative 7 is then reduced, for example, with lithium aluminum hydride, to give the 17β-hydroxymethyl compound 8.

The latter compound is then subjected to oxidation under neutral conditions whereby a primary alcohol is converted to an aldehyde. Although several oxidizing agents are available for effecting this oxidation, such as chromic acid or potassium permanganate (see also "The Chemistry of the Carbonyl Group," S. Patai, ed., Interscience Publishers, New York, 1966, pp. 129–157), we have found that excellent yields of the desired product may be obtained by using dimethylsulfoxide in the presence of triethylaminesulfur trioxide complex. In this manner, 17 - methyl - 3β - (2-tetrahydropyranyloxy)androst-5-ene-17β-carboxaldehyde (9) is obtained.

The carboxaldehyde 9 is then treated with hydroxylamine in the presence of a mineral acid, for example, hydrochloric acid, to give directly the hydroxynitrile 10.

Subsequent oxidation of the latter compound affords 17-methyl - 3 - oxoandrost - 4 - ene-17β-carbonitrile (11). Although this oxidation may be effected by a variety of methods available for oxidizing Δ⁵-3β-hydroxysteroids to Δ⁴-3-ketosteroids (see for example, H. J. E. Loewenthal, Tetrahedron, 6, 269 (1959), the oxidation method of Oppenauer [see C. Djerassi, Organic Reactions, 6, 207 (1951)], has been found to be readily applicable.

17-methyl-3-oxoandrost - 4 - ene-17β-carbonitrile, thus prepared, may be converted to its corresponding Δ¹- and Δ⁶-derivatives according to known procedures: the Δ¹-derivative is produced by 1,2-dehydrogenation with selenium dioxide by the procedure described by Ch. Meystre, et al., Helv. Chim. Acta, 39, 734 (1956) or with dichlorodicyanobenzoquinone (DDQ) in the manner disclosed in British Pat. 852,847. The corresponding Δ⁶-derivative is produced by treatment with tetrachloro-p-benzoquinone (chloranil) by the procedure described by E. J. Agnello and G. D. Laubach, J. Amer. Chem. Soc., 79, 1257 (1957).

17-methyl-3-oxoandrost-4-ene - 17β - carbonitrile (11) and is corresponding Δ¹- and Δ⁶-derivatives, prepared as described above, are compounds of this invention represented by Formula 2 in which X is hydrogen and are within the group of compounds represented by general Formula 1 in which W is methyl, X is hydrogen, Y is carbonitrile, Z is methyl and optional double bonds may be present at positions 1,2 and 6,7.

The compounds of this invention of Formula 2 in which X represents methyl are prepared by a process illustrated by the following formulae in which THP signifies the 2-tetrahydropyranyl radical.

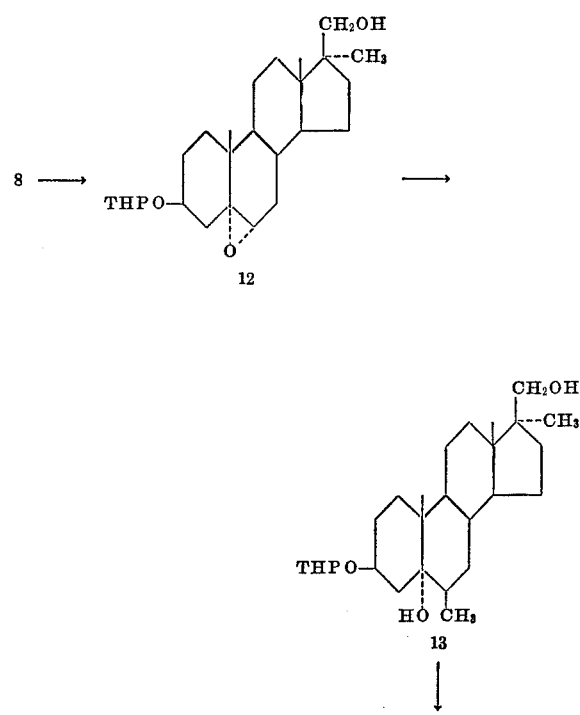

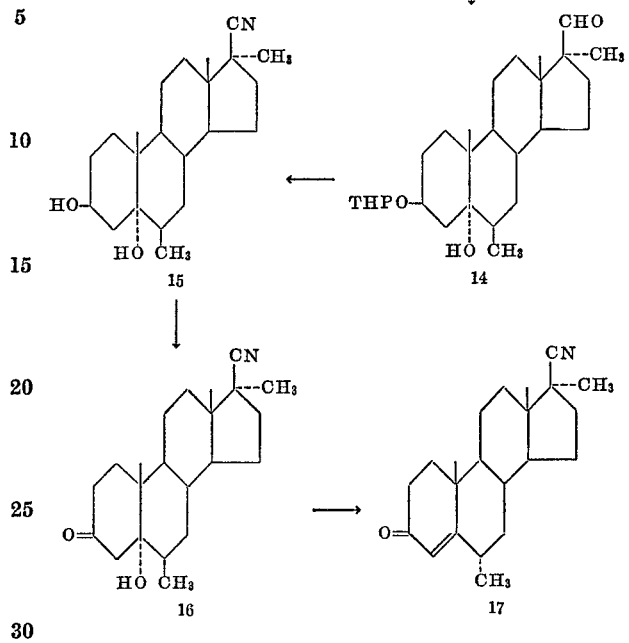

In this process the 17β-hydroxymethyl compound 8, described above, is allowed to react with an organic peracid, for example, perbenzoic acid or m-chloroperbenzoic acid, giving a mixture of 5α,6α- and 5β,6β-epoxides. The 5α,6α-epoxide 12 is readily separated from the mixture by chromatography or crystallization and reacted with methyl magnesium bromide to yield the 5α-hydroxy-6β-methyl compound of Formula 13.

The latter compound is then oxidized and the resulting product, compound 14, is treated with hydroxylamine in the presence of a mineral acid to afford the carbonitrile 15. This conversion, (13→14→15) is effected in the manner described above for the conversion, (8→9→10)

Thereafter carbonitrile 15 is oxidized to afford 5α-hydroxy - 6β,17 - dimethyl-3-oxoandrostane-17β-carbonitrile (16). This latter oxidation may be accomplished by a variety of methods, see Loewenthal, cited above, however, the use of 8 N chromic acid containing sulfuric acid in acetone solution, has been found to be both convenient and efficient.

Thereafter, 5α-hydroxy - 6β,17 - dimethyl-3-oxoandrostane-17β-carbonitrile is treated with a mineral acid, for example, hydrogen chloride in chloroform, to yield 6α,17-dimethyl-3-oxoandrost-4-ene-17β-carbonitrile (17).

This latter carbonitrile may be transformed into its corresponding Δ¹- and Δ⁶-derivatives according to the procedures, described above, for converting 17-methyl-3-oxoandrost-4-ene-17β-carbonitrile to its corresponding Δ¹- and Δ⁶-derivatives.

6α,17-dimethyl-3-oxoandrost-4-ene - 17β - carbonitrile (17) and its corresponding Δ¹- and Δ⁶-derivatives, prepared as described above, are compounds of this invention represented by Formula 2 in which X is methyl and are within the group of compounds represented by Formula 1 in which W and X each are methyl, Y is carbonitrile, Z is methyl and optional double bonds may be present at positions 1,2 and 6,7.

The compounds of this invention of Formula 2 in which X represents fluorine, chlorine or bromine, are prepared by a process illustrated by the following formulae in which X' represents fluorine, chlorine or bromine.

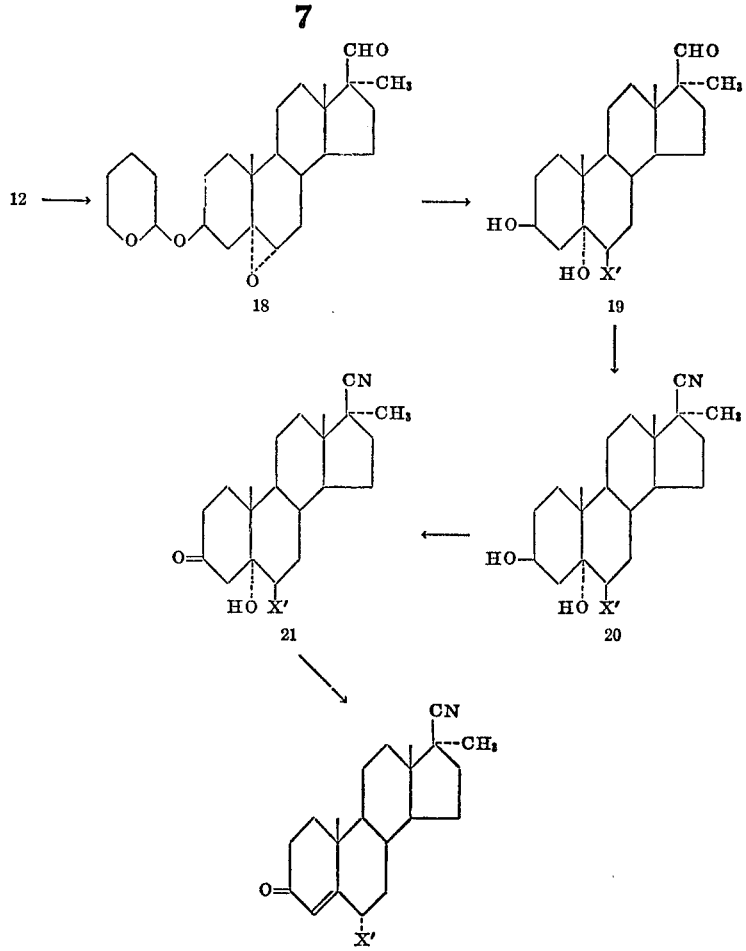

In this process the 5α,6α-epoxide 12, described above, is oxidized to the epoxyaldehyde 18 in the manner described above for the conversion of compound 8 to compound 9. Treatment of this epoxyaldehyde 18 with hydrogen fluoride, hydrogen chloride or hydrogen bromide gives the corresponding halohydrin of Formula 19 in which X' represents fluorine, chlorine or bromine, respectively, with concomitant hydrolysis of the tetrahydropyranyl ether.

Thereafter, the halohydrin of Formula 19 is converted to the corresponding nitrile of Formula 20 with hydroxylamine and a mineral acid, for example, hydrochloric acid. Subsequent oxidation of the 3β-hydroxyl of the corresponding nitrile 20, followed by treatment of the resulting ketonitrile 21 in the manner, described above, for the conversion (15→16→17), affords the 6α-halo derivatives of general Formula 22.

The latter 6α-halo derivatives may be transformed to their corresponding Δ¹-derivatives according to the procedure, described above, for converting 17-methyl-3-oxoandrost-4-ene-17β-carbonitrile to its corresponding Δ¹-derivative.

The corresponding Δ⁶-derivatives of the 6α-halo compounds of general Formula 22 are prepared by epoxidation of the Δ⁶-derivative of 17-methyl-3-oxoandrost-4-ene-17β-carbonitrile (11), described above, with an organic peracid, for example, monoperphthalic acid, in an inert solvent, for example, ether, to give the corresponding 6α,7α-epoxide. Subsequent treatment of this epoxide with the appropriate anhydrous hydrohalic acid, such as hydrogen fluoride, hydrogen chloride or hydrogen bromide (followed by treatment with a strong acid for example, anhydrous hydrogen chloride, when hydrogen fluoride is used), affords the desired 6-halo-17-methyl-3-oxoandrosta-4,6-diene-17-carbonitriles.

The 6α-halo derivatives of Formula 22 and their corresponding Δ¹- and Δ⁶-derivatives, described above, are compounds of this invention represented by Formula 2 in which X is fluorine, chlorine or bromine and are within the group of compounds represented by general Formula 1 in which W is methyl, X is fluorine, chlorine or bromine, Y is carbonitrile, Z is methyl and optional double bonds may be present at positions 1,2 and 6,7.

The compounds of this invention of Formula 3 in which X is hydrogen are prepared by a process illustrated by the following formulae.

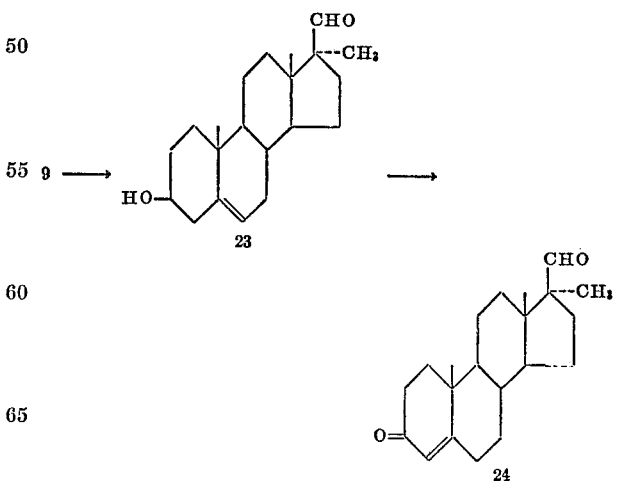

In this process acid hydrolysis of the carboxaldehyde 9, described above, for example, hydrolysis with 10% hydrochloric acid in methylene chloride-ethanol solution, readily affords 3β-hydroxy-17-methylandrost-5-ene-17β-carboxaldehyde (23), which on oxidation, preferably using the conditions of the Oppenauer method, yields 17-methyl-3-oxoandrost-4-ene-17β-carboxaldehyde (24).

The latter compound is converted to its corresponding Δ¹- and Δ⁶-derivatives according to the procedure, described above, for converting 17-methyl-3-oxoandrost-4-ene-17β-carbonitrile to its corresponding Δ¹- and Δ⁶-derivatives.

17-methyl-3-oxoandrost-4-ene - 17β - carboxaldehyde (24) and its corresponding Δ¹- and Δ⁶-derivatives, prepared as described above, are compounds of this invention represented by Formula 3 in which X is hydrogen and are within the group of compounds represented by Formula 1 in which W is methyl, X is hydrogen, Y is carboxaldehyde and Z is methyl and optional double bonds may be present at positions 1,2 and 6,7.

The compounds of this invention of Formula 3 in which X represents methyl are prepared by a process illustrated by the following formulae.

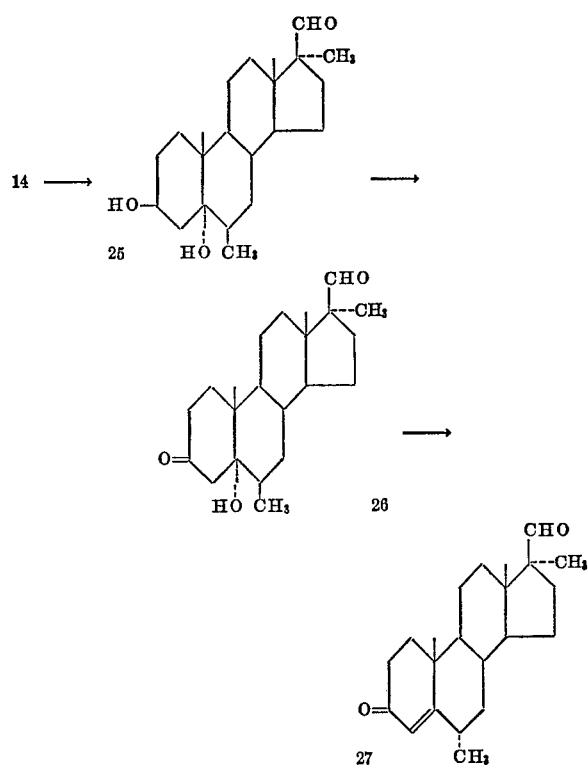

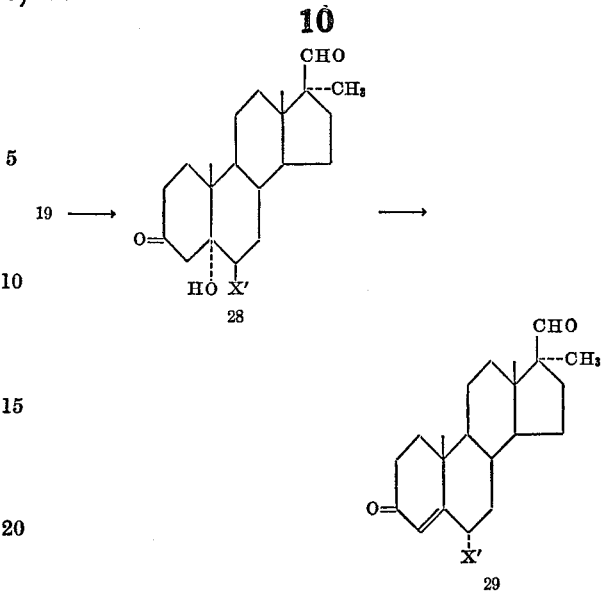

In this process, compound 14, described above, is hydrolyzed, for example, with 10% hydrochloric acid in methanol solution to give the corresponding 3β-alcohol of Formula 25. Oxidation of the latter compound with 8 N-chromic acid containing sulfuric acid in acetone solution, affords the ketoaldehyde 26 which on treatment with a mineral acid, for example, hydrochloric acid in chloroform solution, gives 6α,17-dimethyl-3-oxoandrost-4-ene-17β-carbonitrile (27).

This latter carbonitrile is converted to its corresponding Δ¹- and Δ⁶-derivatives according to the procedure, described above, for converting 17-methyl-3-oxoandrost-4-ene-17β-carbonitrile to its corresponding Δ¹- and Δ⁶-derivatives. 6α,17-dimethyl-3-oxoandrost-4-ene-17β-carbonitrile (27) and its Δ¹- and Δ⁶-derivatives, described above, are compounds of this invention represented by Formula 3 in which X is methyl and are within the group of compounds represented by Formula 1 in which W, X and Z are methyl, Y is carboxaldehyde, and optional double bonds may be present at positions 1,2 and 6,7.

The compounds of this invention of Formula 3 in which X represents the halogens fluorine, chlorine, or bromine are prepared by the process represented by the following formulae in which X' represents fluorine, chlorine or bromine.

For this process the appropriate halohydrin of Formula 19, described above, is oxidized to the corresponding 3-oxohalohydrin of Formula 28, which in turn is treated with an acid to afford the corresponding 6α-halo derivative of Formula 29 in which X' is as defined above. In this case, the oxidation and acid treatment are performed in the manner described above for the conversion (25)→(26)→(27).

The latter 6α-halo derivatives of Formula 29 may be transformed to their corresponding Δ¹-derivatives according to the procedure, described above, for converting 17-methyl-3-oxoandrost-4-ene-17β - carbonitrile to its corresponding Δ¹-derivative.

The corresponding Δ⁶-derivatives of the 6α-halo compounds of Formula 29 may be prepared by epoxidation of the Δ⁶-derivative of 17 - methyl-3-oxoandrost-4-ene-17β-carboxaldehyde (24), described above, with an organic peracid, for example, monoperphthalic acid, in an inert solvent, for example, ether, to give the corresponding 6α, 7α-epoxide. Subsequent treatment of this epoxide with the appropriate anhydrous hydrohalic acid, hydrogen fluoride, hydrogen chloride or hydrogen bromide (followed by treatment with a strong acid, for example, anhydrous hydrogen chloride, in the case where hydrogen fluoride is used), affords the desired 6-halo-17-methyl-3-oxoandrosta-4,6-diene-17-carboxaldehydes.

The 6α-halo derivative of Formula 29 and their corresponding Δ¹- and Δ⁶-derivative, described above, are compounds of this invention represented by Formula 3 in which X is fluorine, chlorine or bromine and are within the group of compounds represented by general Formula 1 in which W is methyl, X is fluorine, chlorine or bromine, Y is carboxaldehyde, Z is methyl and optional double bonds may be present at positions 1,2 and 6,7.

The compounds of this invention of Formula 4 are prepared by a process illustrated by the following formulae in which Z is hydrogen or methyl, Q is as defined in the first instance, and the dotted lines at positions 1,2 and 6,7 have the same significance as described in the first instance.

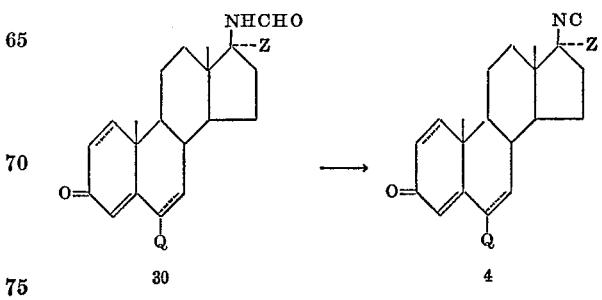

In practising this process, the formamide of Formula 30, described below, is reacted with a suitable dehydrating agent under neutral or mildly basic conditions. Preferred dehydrating agents and conditions for this process include the use of phosphorus oxychloride, or an organic sulfonyl chloride such as p-toluenesulfonyl chloride, in pyridine solution at temperatures ranging from —30° to 25° C. The resulting isocarbonitrile of Formula 4 may be isolated by dilution of the reaction mixture with water, followed by filtration or extraction with a water-immiscible organic solvent. Purification may be achieved by chromatography and crystallization.

The steroid isocarbonitriles of Formula 4 are compounds of this invention of general Formula 1 in which W is methyl, X is hydrogen, Y is isocarbonitrile, Z is hydrogen or methyl and optional double bonds may be present at positions 1,2 or 6,7.

The corresponding formamides of Formula 30, required for the preceding process, are obtained as follows:

N-(3-oxoandrost-4-en-17β-yl)formamide (30 in which Q and Z are both hydrogen and the linkages at positions 1,2 and 6,7 are saturated) may be prepared according to the procedure of J. Joska and F. Sorm, Chem. Listy, 49, 1687(1955); its corresponding Δ¹- and Δ⁶-analogs may be prepared readily in the manner described above for preparing the corresponding Δ¹- and Δ⁶-derivatives of 17β-methyl-3-oxoandrost-4-ene-17β-carbonitrile.

The formamides of Formula 30 in which Z is methyl and Q is hydrogen are prepared by the following procedure, illustrated by Formulae 31 to 37, inclusive.

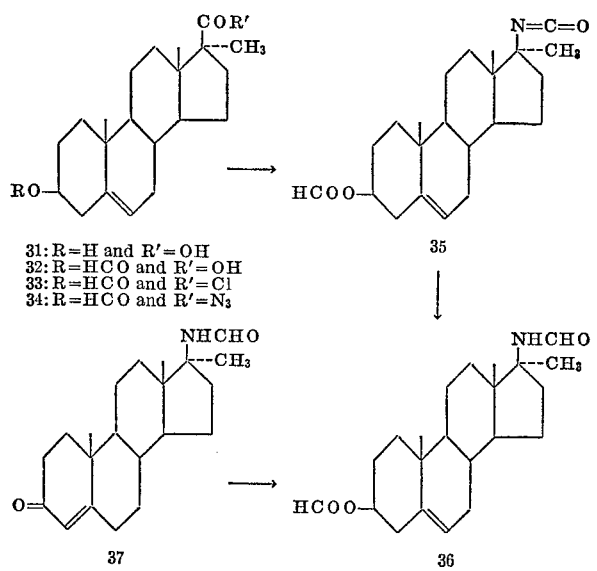

31: R=H and R'=OH
32: R=HCO and R'=OH
33: R=HCO and R'=Cl
34: R=HCO and R'=N₃

According to this procedure, 3β-hydroxy-17-methyl-androst-5-ene-17β-carboxylic acid (31), described by Pl. A. Plattner, et al., Helv. Chim. Acta, 31, 603 (1948), is converted with formic acid to its formate 32, which on reaction with thionyl chloride yields the corresponding acid chloride 33. The latter is allowed to react with triethylammonium azide at or below room temperature, preferably at temperatures ranging from —10° to 30° C., from five minutes to three hours, to yield the acid azide 34. (The use of triethylammonium azide in this case appears to be novel and represents a substantial improvement over known methods for converting acid chlorides to acid azides. For example, in this case, the reaction of the acid chloride 33 with conventional sodium azide in aqueous acetone yields only compound 32.) The acid azide 34 is now rearranged by heating, for example, by boiling in benzene solution, to form 3β-formyloxy - 17 - methylandrost - 5 - en-17β-isocyanate (35). Reaction of latter with formic acid yields the formamide 36, which when subjected to the conditions of the Oppenauer oxidation method gives the key formamide, N-(17-methyl-3-oxoandrost-4-en-17β-yl)formamide (37).

In this process it will be obvious that the use of the 3-formate derivatives is not essential but rather more convenient. Other acylate derivatives, such as the 3-acetate, or 3-propionate, could also be used. However, the use of these other acylates necessitates a hydrolysis of the resulting 3-acylate corresponding to the formamide 36 before proceeding with the oxidative step of this process.

The formamide 37 is converted to its Δ¹- and Δ⁶-derivatives in the manner described above for the conversion of 17-methyl - 3 - oxoandrost-4-ene-17β-carbonitrile to its corresponding Δ¹- and Δ⁶-derivatives.

The 6-halo - Δ⁶ - derivatives of the formamide 37 are prepared from the Δ⁶-derivative by epoxidation followed by reaction of the epoxide with a hydrohalic acid as described above for the corresponding derivatives of 17-methyl - 3 - oxoandrost - 4 - ene - 17β - carboxaldehyde (24).

Alternatively, the key formamide 37 may be prepared by another process illustrated by the following formulae.

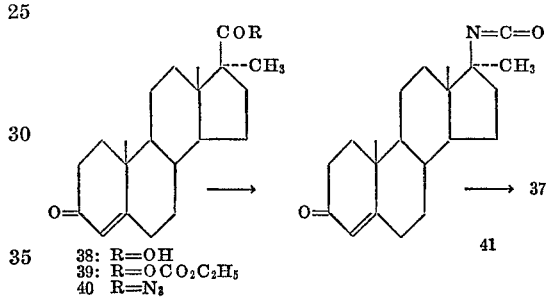

38: R=OH
39: R=OCO₂C₂H₅
40 R=N₃

In this alternate procedure, 17-methyl-3-oxoandrost-4-ene-17β-carboxylic acid (38), described by Hs. H. Günthard, E. Beriger, Ch. R. Engel and H. Heusser, Helv. Chim. Acta, 35, 2437 (1952), is converted to the mixed anhydride 39 by reaction with ethyl chloroformate and triethylamine. The mixed anhydride 39 is then allowed to react with sodium azide at elevated temperature, for example in refluxing chlorobenzene, to give 17-methyl - 3 - oxoandrost - 4 - en-17β-isocyanate (41). The acid azide 40 is an intermediate in this reaction but at the reaction temperatures used it rearranges spontaneously to the isocyanate 41.

Thereafter, reaction of the isocyanate 41 with formic acid yields the key formamide 37.

In a related aspect of this invention the formamide 36, or one of its corresponding 3-lower acyl derivatives, described above, may be used to prepare the isocarbonitrile 4, in which Z is methyl and the linkages at positions 1,2 and 6,7 are saturated; by another process. Thus, the formamides are converted to their corresponding 17β-isocarbonitrile derivatives by reaction with one of the suitable dehydrating agents described above (see the process 30→4). Subsequent hydrolysis of these 17β-isocarbonitrile derivatives affords 17-methyl - 3β - hydroxyandrost-5-en-17β-isocarbonitrile. This hydrolysis is effected under basic conditions, for example, by using potassium carbonate in methanol solution. Oxidation of 17-methyl-3β - hydroxyandrost - 5 - en - 17β - isocarbonitrile with chromic acid-pyridine complex, G. I. Poos, et al., J. Am. Chem. Soc., 75, 422 (1953), affords 17-methyl-3-oxoandrost - 4 - en - 17β - isocarbonitrile (4 in which Z is methyl and the linkages at positions 1,2 and 6,7 are saturated).

For preparing the compound of this invention of Formula 5, 3-oxoestr-4-en-17β-isocarbonitrile, the process illustrated by the following formulae may be used,

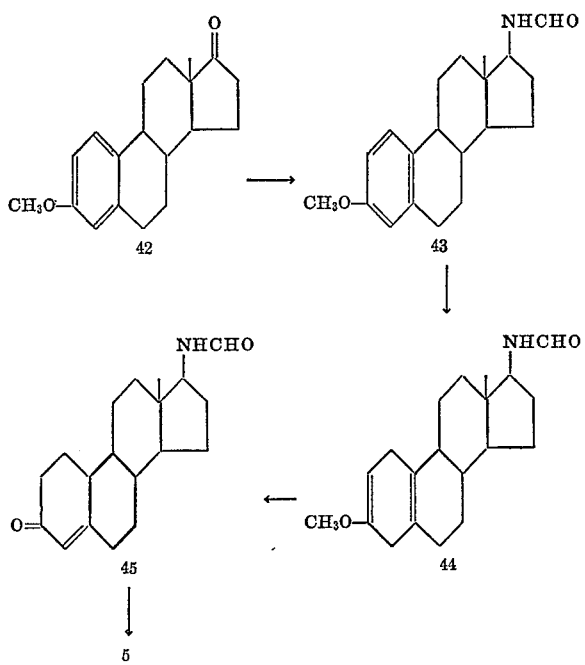

In this process estrone methyl ether (42) is allowed to react with formamide and formic acid to give the formamide 43. On reduction with an alkali metal, for example, sodium in liquid ammonia in the presence of an alcohol, for example, t-butanol, the formamide 43 yields the 1,4-dihydro derivative 44; which, on hydrolysis with a dilute mineral acid, for example, hydrochloric acid, yields the corresponding Δ⁴-3-ketoformamide 45.

Treatment of the Δ⁴ - 3 - ketoformamide 45 with a suitable dehydrating agent, as described above (see the process 30→4) yields the compound of this invention of Formula 5, which is the compound represented by general Formula 1 in which W and X each are hydrogen, Y is isocarbonitrile, Z is hydrogen and double bonds are not present at positions 1,2 and 6,7.

It should be noted that many of the 17β-formamides of this invention also possess antiandrogenic properties, for example, N-(17 - methyl - 3 - oxoandrost-4-en-17β-yl)formamide (37) is a very potent inhibitor of androgen biosynthesis in the test mentioned above. The 17β-formamides may therefore be employed as antiandrogenic agents in the manner described above for the other compounds of this invention.

The following examples will further illustrate this invention. All optical rotations are determined at 24° C. and at a concentration of about 1 percent.

EXAMPLE 1

17β-hydroxymethyl-17-methyl-3β-(2-tetrahydropyranyloxy)androst-5-ene (8)

A solution of 35.0 g. of methyl 3β-hydroxy-17-methylandrost-5-ene-17β-carboxylate (6), 3.5 g. of p-toluenesulfonic acid, and 70 ml. of dihydropyran in 1 l. of benzene is stirred for 1.5 hr. The solution is neutralized with 3 ml. of pyridine, washed with water, dried, and concentrated. A solution of the crude product (compound 7) in 1:1 benzene-petroleum ether is filtered through a small column of silica gel and the resulting pale yellow solid is dissolved in 250 ml. of tetrahydrofuran (THF) and added with stirring to 20 g. of lithium aluminum hydride (LiAlH₄) in 250 ml. of THF. After rinsing with an additional 100 ml. of THF, the mixture is stirred and heated overnight under reflux. The mixture is decomposed with 100 ml. of ethyl acetate followed by the addition of about 300 ml. of saturated aqueous potassium sodium tartrate solution. The solution is decanted from the precipitated inorganic salts. Removal of solvent and crystallization of the residue from hexane gives the title compound, M.P. 143–145° C.

EXAMPLE 2

17-methyl-3β-(2-tetrahydropyranyloxy)androst-5-ene-17β-carboxaldehyde (9)

To a solution of 30.0 g. of 17β-hydroxymethyl-17-methyl - 3β - (2-tetrahydropyranyloxy)androst-5-ene, prepared as described in Example 1, in 600 ml. of dimethyl sulfoxide (DMSO) 68 ml. of triethylamine is added at 30° C., followed by a solution of 43 g. of sulfur trioxide-triethylamine complex in 250 ml. of DMSO added over a period of 5 min. After stirring for 30 min. the mixture, containing precipitated product, is cooled in ice and 1 l. of ice water is added slowly. The precipitate is collected affording the title compound as a colorless solid, $$\nu_{max.}^{CHCl_3} \ 2690, \ 1710 \ cm.^{-1}$$

The sulfur trioxide-triethylamine complex is prepared according to the procedure of J. A. Moede and C. Curran, J. Am. Chem. Soc., 71, 852 (1949).

EXAMPLE 3

3β-hydroxy-17-methylandrost-5-ene-17β-carbonitrile (10)

A mixture of 18.0 g. of 17-methyl-3β-(2-tetrahydropyranyloxy)androst-5-ene-17β-carboxaldehyde, prepared as described in Example 2, and 18 g. of hydroxylamine hydrochloride in 260 ml. of ethanol and 5 ml. of concentrated hydrochloric acid is heated under reflux overnight under nitrogen. After evaporation to dryness under reduced pressure, the residue is taken up in ether and the solution is washed with water, dried and evaporated to give a pale yellow solid. Filtration through a small column of silica gel in ether-benzene 5:95 gives the title compound; M.P. 156–158°, $[\alpha]_D^{dioxane}$ −52° after one crystallization from methylene chloride-hexane.

EXAMPLE 4

17-methyl-3-oxoandrost-4-ene-17β-carbonitrile (11)

About 25 ml. of solvent is removed by distillation from a solution of 4.00 g. of 3β-hydroxy-17-methylandrost-5-ene-17β-carbonitrile, prepared as described in Example 3, in 160 ml. of toluene and 36 ml. of cyclohexanone. A solution of 1.85 g. of aluminum isopropoxide in 12 ml. of toluene is added and the mixture is heated under reflux for 1 hr. After decomposition with potassium sodium tartrate solution and steam distillation, the product is extracted with ether and chromatographed on silica gel. Homogeneous material eluted with ether-benzene 5:95 is crystallized from methanol to yield the title compound; M.P. 142–143° C., $[\alpha]_D^{dioxane}$ +117°.

EXAMPLE 5

5α,6α-epoxy-17β-hydroxymethyl-17-methyl-3β-(2-tetrahydropyranyloxy)androstane (12)

To a stirred, ice-cooled solution of 2.00 g. of 17β-hydroxymethyl - 17 - methyl-3β-(2-tetrahydropyranyloxy) androst-5-ene, prepared as described in Example 1, in 50 ml. of chloroform is added 1.6 g. of m-chloroperbenzoic acid in small portions. After stirring for 3 hr., the solution is washed well with 5% aqueous sodium carbonate and with water, dried, and evaporated. The residue, consisting of a mixture of α- and β-epoxides, is crystallized from methylene chloride-hexane and then from methanol to yield the title compound, M.P. 191–196° C.

EXAMPLE 6

3β,5α-dihydroxy-6β,17-dimethylandrostane-17β-carbonitrile (15)

To 50 ml. of 3 M ethereal methylmagnesium bromide is added dropwise with stirring a solution of 5.0 g. of 5α,6α - epoxy - 17β - hydroxymethyl - 17 - methyl-3β-(2-tetrahydropyranyloxy)androstane, prepared as described in Example 5 in 100 ml. of THF. The mixture is stirred overnight at room temperature under an atmosphere of nitrogen, cooled in an ice bath, and just sufficient saturated aqueous ammonium chloride solution is added dropwise to decompose excess Grignard reagent and hydrolyze the magnesium complexes. The solution is decanted from the precipitated inorganic salts and evaporated to dryness under reduced pressure. The residue, compound 13, is dissolved in 100 ml. of dimethyl sulfoxide and 12 ml. of triethylamine is added, followed by a solution of 8 g. of sulfur trioxidetriethylamine complex in 40 ml. of dimethyl sulfoxide. After stirring for 30 min., the mixture is cooled in ice and 150 ml. of cold water is added slowly. The precipitated product is isolated by ether extraction and consists mainly of 5α-hydroxy-6β,17-dimethyl - 3β - (2 - tetrahydropyranyloxy)androstane-17β-carboxaldehyde (14)

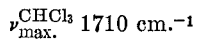 1710 cm.$^{-1}$

A mixture of 3.0 g. of the latter compound and 3.0 g. of hydroxylamine hydrochloride in 45 ml. of ethanol and 1 ml. of hydrochloric acid is heated under reflux overnight under nitrogen. After evaporation of dryness under vacuum, the residue is extracted with ether and the crude product is chromatographed in silica gel. Elution with ether-benzene 1:9 yields the title compound

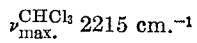 2215 cm.$^{-1}$

EXAMPLE 7

6α,17-dimethyl-3-oxoandrost-4-ene-17β-carbonitrile (17)

To a stirred solution of 2.0 g. of 3β,5α-dihydroxy-6β,17-dimethylandrostane-17β-carbonitrile, prepared as described in Example 6, in 50 ml. of acetone in a bath at 10° C., a slight excess of 8 N chromic acid containing sulfuric acid, K. Bowden, et al., J. Chem. Soc., 39 (1946) is added dropwise. After stirring for 15 minutes, the excess oxidant is destroyed by the addition of isopropanol. Slow addition of two volumes of water precipitates the hydroxyketone 16, 5α-hydroxy-6β,17-dimethyl-3-oxoandrostane-17β-carbonitrile.

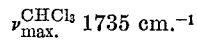 1735 cm.$^{-1}$

Anhydrous hydrogen chloride is passed for 30 minutes through an ice-cooled solution of 1.0 g. of the hydroxyketone 16 in 25 ml. of chloroform. After standing for an additional hour, the solution is washed with 10% sodium bicarbonate solution and with water. The residue obtained after drying and removal of solvent is chromatographed on silica gel to yield 6α,17-dimethyl-3-oxoandrost-4-ene-17β-carbonitrile.

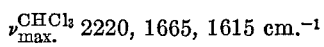 2220, 1665, 1615 cm.$^{-1}$

EXAMPLE 8

6β-fluoro-3β,5α-dihydroxy-17-methylandrostane-17β-carbonitrile (20, X'=F)

To a stirred mixture of 4.0 g. of 5α,6α-epoxy-17β-hydroxymethyl - 17 - methyl-3β-(2-tetrahydropyranyloxy) androstane, prepared as described in Example 5, 10 ml. of triethylamine, and 80 ml. of dimethyl sulfoxide, is added a solution of 6 g. of sulfur trioxide-triethylamine complex in 30 ml. of dimethyl sulfoxide. After 30 minutes the mixture is diluted with ice-water and extracted with ether to yield the epoxyaldehyde 18. A solution of this epoxyaldehyde in 40 ml. of chloroform is added to a mixture of 4 g. of anhydrous hydrogen fluoride, 8 ml. of tetrahydrofuran, and 10 ml. of chloroform at −60°. The solution is kept at −10° C. for 2 hr. and then poured with stirring into cold aqueous potassium carbonate solution. The organic phase is washed with water dried and evaporated to yield the halohydrin 19 (X'=F),

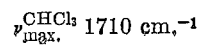 1710 cm.$^{-1}$

The latter is dissolved in 60 ml. of of ethanol and 4.0 g. of hydroxylamine hydrochloride and 1.5 ml. of concentrated hydrochloric acid are added. After refluxing overnight, the solution is evaporated to dryness and the residue is extracted with ethyl acetate. The product consists mainly of the title compound 20, (X'=F),

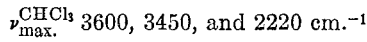 3600, 3450, and 2220 cm.$^{-1}$

Using a similar procedure but substituting anhydrous hydrogen chloride or hydrogen bromide in chloroform for hydrogen fluoride in tetrahydrofuran-chloroform, 6β-chloro-3β,5α-dihydroxy - 17 - methylandrostane-17β-carbonitrile (20, X'=Cl) or 6β-bromo-3β,5α-dihydroxy-17-methylandrostane-17β-carbonitrile (20, X'=Br) may be obtained, respectively, via their respective halohydrins 19 (X'=Cl) and 19 (X'=Br).

EXAMPLE 9

6α-fluoro-17-methyl-3-oxoandrost-4-ene-17β-carbonitrile (22, X'=F)

By following the procedure of Example 7 but using an equivalent amount of 6β-fluoro-3β,5α-dihydroxy-17-methylandrostane-17β-carbonitrile, prepared as described in Example 8, instead of 3β,5α-dihydroxy-6β,17-dimethylandrostane-17β-carbonitrile, the title compound,

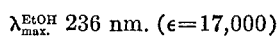 236 nm. (ε=17,000)

is obtained.

Similarly, but replacing 6β-fluoro-3β,5α-dihydroxy-17-methylandrostane-17β-carbonitrile in the above procedure by an equimolar amount of 6β-chloro-3β,5α-dihydroxy-17-methylandrostane-17β-carbonitrile or 6β-bromo-3β,5α-dihydroxy - 17 - methylandrostane-17β-carbonitrile, prepared as described in Example 8, 6α-chloro-17-methyl-3-oxoandrost - 4 - ene - 17β - carbonitrile and 6α-bromo-17-methyl-3-oxoandrost - 4 - ene - 17β - carbonitrile may be obtained, respectively.

EXAMPLE 10

3β-hydroxy-17-methylandrost-5-ene-17β-carboxaldehyde (23)

To a solution of 1.5 g. of 17-methyl-3β-(2-tetrahydropyranyloxy)androst-5-ene-17β-carboxaldehyde, prepared as described in Example 2, in 10 ml. of ethanol and 5 ml. of methylene chloride, 1.5 ml. of 10% hydrochloric acid is added. After standing for two hr. at room temperature, the solution is concentrated under reduced pressure and diluted with water. A solution of the resulting brownish solid in benzene is filtered through a small column of silica gel. Elution of the column with benzene-ether 9:1, and crystallization of the eluate from methylene chloride-hexane gives the title compound, M.P. 137° C. (dec.), [α]$_D^{dioxane}$ −81°.

EXAMPLE 11

17-methyl-3-oxoandrost-4-ene-17β-carboxaldehyde (24)

3β-hydroxy - 17 - methylandrost-5-ene-17β-carboxaldehyde (3.0 g.), prepared as described in Example 10, is dissolved in a mixture of 150 ml. of toluene and 35 ml. of cyclohexanone. After distilling off a small amount of solvent, a solution of 1.5 g. of aluminum isopropoxide in 25 ml. of toluene is added, and the mixture is heated under reflux for one hour. After addition of 50 ml. of saturated aqueous potassium sodium tartrate solution, the mixture is steam-distilled, and the product is isolated by ether extraction. Chromatography on silica gel (elution with ether-benzene 5:95) followed by crystallization from methylene chloride-hexane gives the title compound, M.P. 132–134° C.,

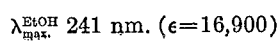 241 nm. (ε=16,900)

EXAMPLE 12

6α,17-dimethyl-3-oxoandrost-4-ene-17β-carboxaldehyde (27)

5α - hydroxy - 6β,17-dimethyl-3β-(2-tetrahydropyranyloxy)-androstane-17β-carboxaldehyde (14) (2.0 g.), prepared as described in Example 6, is dissolved in 60 ml. of ethanol containing 2 ml. of 10% hydrochloric acid. After two hours at room temperature, the mixture is diluted with an equal volume of water and the precipitated solid, the 3β-alcohol (25), is collected and dried.

By following the procedure of Example 7 but using an equivalent amount of the 3β-alcohol (25), obtained above, instead of 3β,5α - dihydroxy - 6β,17 - dimethylandrostane-17β-carbonitrile, the title compound, $$\lambda_{max.}^{EtOH}\ 241\ nm.\ (\epsilon=15,800)$$

is obtained.

EXAMPLE 13

6α-fluoro-17-methyl-3-oxoandrost-4-ene-17β-carboxaldehyde (29, X′=F)

By following the procedure of Example 7 but using an equivalent amount of 6β-fluoro-3β,5α-dihydroxy-17-methylandrostane-17β-carboxaldehyde (19, X′=F), prepared as described in Example 8, instead of 3β,5α-dihydroxy-6β,17-dimethylandrostane-17β-carbonitrile, the title compound, $$\lambda_{max.}^{EtOH}\ 236\ nm.\ (\epsilon=16,700)$$

is obtained.

Similarly, but replacing 6β-fluoro-,3β,5α-dihydroxy-17-methylandrostane-17β-carboxaldehyde in the above procedure by an equimolar amount of the corresponding halohydrin 19 (X′=Cl) or the corresponding halohydrin 19 (X′=Br), prepared according to the procedure of Example 8, then 6α-chloro-17-methyl-3-oxoandrost-4-ene-17β-carboxaldehyde and 6α-bromo-17-methyl-3-oxoandrost-4-ene-17β-carboxaldehyde are obtained, respectively.

EXAMPLE 14

3-oxoandrost-4-en-17β-isocarbonitrile (4, Z=Q=H and the linkages at positions 1,2 and 6,7 are saturated To an ice-cooled solution of 23.0 g. of N-(3-oxoandrost-4-en-17β-yl)formamide [J. Joska and F. Sorm, Chem. Listy 49, 1687 (1955); Chem. Abs. 50: 5715 (1956)] in 200 ml. of pyridine is added 14.5 g. of p-toluenesulfonyl chloride. After stirring for 1 hr. at 0° C., the solution is diluted with water and extracted with ethyl acetate. The extract is washed with water, dried, and concentrated. Benzene is added and removed by evaporation under reduced pressure, and this process is repeated several times to remove pyridine. The resulting reddish-brown gum is chromatographed on silica gel. The material eluted with benzene containing 5% ether is crystallized from methylene chloride-hexane and then methanol to yield the title compound, M.P. 145–147° C., $[\alpha]_D^{dioxane}+165°$.

The title compound is also obtained when p-toluenesulfonyl chloride is replaced by an equimolar amount of phosphorus oxychloride in the procedure.

EXAMPLE 15

17-methyl-3-oxoandrost-4-en-17β-isocarbonitrile (4, Z=CH₃, Q=H, and the linkages at positions 1,2 and 6,7 are saturated)

To a solution of 3.5 g. of N-(17-methyl-3-oxoandrost-4-en-17β-yl)formamide, prepared as described in Examples 20, 23 or 24, in 30 ml. of pyridine cooled in a bath at −10° to −5° C., 1.01 g. of phosphorus oxychloride is added with stirring. After 1 hr., ice and water are added and the mixture is kept overnight in the refrigerator. Extraction with ethyl acetate is followed by washing well with water, drying and evaporation. Benzene is added and removed by evaporation under reduced pressure several times to remove residual pyridine. The remaining brown foam is chromatographed on neutral alumina. Elution with ether-benzene 5:95 and then with ether yielded a total of 2.51 g. of pale yellow solid which on recrystallization from methylene chloride-hexane affords the title compound, M.P. 128–129° C., $$\lambda_{max.}^{EtOH}\ 240\ nm.\ (\epsilon=17,240)$$

The title compound is also obtained when phosphorus oxychloride is replaced by an equimolar amount of p-toluene-sulfonyl chloride in the above procedure.

EXAMPLE 16

By following the procedures of Example 14 or Example 15 but replacing N-(3-oxoandrost-4-en-17β-yl)formamide or N-(17-methyl-3-oxoandrost-4-en-17β-yl)formamide, respectively, with an equimolar amount of N-(3-oxoandrosta-1,4-dien-17β-yl)formamide, or N-(17-methyl-3-oxoandrosta-1,4-dien-17β-yl)formamide, both prepared as described in Example 25, or N-(3-oxoandrosta-4,6-dien-17β-yl)formamide, or N-(17-methyl-3-oxoandrosta-4,6-dien-17β-yl)formamide, both prepared as described in Example 26, or N-(6-fluoro-3-oxoandrosta-4,6-dien-17β-yl)formamide, or N-(6-chloro-3-oxoandrosta-4,6-dien-17β-yl)formamide, or N-(6-bromo-3-oxoandrosta-4,6-dien-17β-yl)formamide, or N-(6-fluoro-17-methyl-3-oxoandrosta-4,6-dien-17β-yl)formamide, or N-(6-chloro-17-methyl-3-oxoandrosta-4,6-dien-17β-yl)formamide, or N - (6 - bromo-17-methyl-3-oxoandrosta-4,6-dien-17β-yl) formamide, all prepared as described in Example 28, there are obtained, 3-oxoandrosta-1,4-dien-17β-isocarbonitrile, 17 - methyl - 3-oxoandrosta-1,4-dien-17β-isocarbonitrile, M.P. 133–135° C., $[\alpha]_D^{24°}+65°$ (C.=1%, dioxane), 3-oxoandrosta - 4,6 - dien-17β-isocarbonitrile, 17-methyl-3-oxoandrosta-4,6-dien-17β-isocarbonitrile, 6-fluoro-3-oxoandrosta-4,6-dien-17β-isocarbonitrile, 6-chloro-3-oxoandrosta-4,6-dien-17β-isocarbonitrile, $$\lambda_{max.}^{EtOH}\ 286\ nm.\ \epsilon(0=24,00)$$

6 - bromo - 3-oxoandrosta-4,6-dien-17β-isocarbonitrile, 6-fluoro - 17-methy-3-oxoandrosta-4,6-dien-17β-isocarbonitrile, 6-chloro-17-methyl-3-oxoandrosta-4,6-dien-17β-isocarbonitrile, $$\lambda_{max.}^{EtOH}\ 286\ nm.\ (\epsilon=24,300)$$

and 6 - bromo-17-methyl-3-oxoandrosta-4,6-dien-17β-isocarbonitrile, respectively.

EXAMPLE 17

3β-hydroxy-17-methylandrost-5-ene-17β-carboxylic acid formate (32)

A suspension of 10.0 g. of 3β-hydroxy-17-methylandrost-5-ene-17β-carboxylic acid, described by Pl. A. Plattner, et al., cited above, in 100 ml. of 97–100% formic acid is stirred overnight at room temperature, diluted with 100 ml. of water, and filtered. The product is dissolved in methylene chloride and the solution is dried and concentrated to dryness to yield the title compound, M.P. 200–208° C., $$\nu_{max.}^{CHCl_3}\ 1725-1690,\ 1180\ cm.^{-1}$$

EXAMPLE 18

3β-hydroxy-17-methylandrost-5-en-17β-isocyanate formate (35)

A solution of 10.0 g. of 3β-hydroxy-17-methylandrost-5-ene-17β-carboxylic acid formate, prepared as described in Example 17, in 100 ml. of benzene and 50 ml. of thionyl chloride is kept overnight at room temperature. The solution is concentrated under reduced pressure. Benzene is added and evaporated under reduced pressure several times to remove all thionyl chloride. The acid chloride 33, 3β-hydroxy-17-methylandrost-5-ene-17β-carbonyl chloride formate, is thus obtained as a brown solid, $\nu_{max}^{CHCl_3}$ 1785, 1720 and 1185 cm.$^{-1}$ A solution of hydrazoic acid in chloroform is prepared as follows: To a well-stirred suspension of 260 g. of sodium azide in 260 ml. of water and 1.2 l. of chloroform cooled in an ice-salt bath to 0° C. is added dropwise 110 ml. of concentrated sulfuric acid at such a rate as to keep the temperature between 0° and 5° C. On completion of the addition, the mixture is filtered, and the chloroform layer is separated and dried over magnesium sulfate. Titration of an aliquot with 1 N sodium hydroxide solution with phenolphthalein as indicator shows the solution to be 2.35 N.

To 11 ml. of this solution is added 3.8 ml. of triethylamine. Evaporation to dryness under reduced pressure leaves a solid residue which is dissolved in 55 ml. of dry acetone. The solution is added with stirring to a solution of 10.0 g. of acid chloride 33 in 30 ml. of benzene. After stirring for 1 hr. at room temperature, the mixture is concentrated to dryness under reduced pressure and the residue is partitioned between ether and water. After washing with water the ether phase is dried and evaporated to yield the acid azide 34, 3β-hydroxy-17-methylandrost-5-ene-17β-carbonyl azide formate, as a pale yellow solid, $\nu_{max}^{CHCl_3}$ 2140, 1715, 1180 cm.$^{-1}$ A solution of this material in 80 ml. of benzene is heated under reflux for 4 hr. Chromatography on silica gel (elution with ether-benzene, 5:95) yields the title compound as an off-white solid, $\nu_{max}^{CHCl_3}$ 2260, 1720, and 1190 cm.$^{-1}$

EXAMPLE 19

N-(3β-formyloxy-17-methylandrost-5-en-17β-yl) formamide (36)

About 6 ml. is distilled from a mixture of 40 ml. benzene and 6.5 ml. formic acid. A solution of 6.3 g. of 3β - hydroxy - 17 - methylandrost-5-en-17β-isocyanate formate, prepared as described in Example 18, in 40 ml. of benzene is added and the solution is heated under reflux under nitrogen for 3.5 hr. After cooling, the solution is diluted with methylene chloride, washed with saturated sodium bicarbonate solution and water, dried, and evaporated to yield the title compound as an off-white solid, $\nu_{max}^{CHCl_3}$ 3440, 3390, 1718, 1675, and 1185 cm.$^{-1}$ Chromatography on silica gel (elution with methylene chloride) gives a colorless solid, M.P. 204–205° C.

EXAMPLE 20

N-(17-methyl-3-oxoandrost-4-en-17β-yl)formamide (37)

A suspension of 6.5 g. of N-(3β-formyloxy-17-methylandrost-5-en-17β-yl)formamide, prepared as described in Example 19, in 325 ml. of toluene and 46 ml. of cyclohexanone is stirred and distilled until about 10 ml. of distillate has been collected. A solution of 5.8 g. of aluminum isopropoxide in 20 ml. of toluene is added and the mixture is stirred and heated under reflux for 10 hr. After standing overnight, 80 ml. of saturated potassium sodium tartrate solution is added and the mixture is steam-distilled. Filtration of the residue affords a yellow brown solids, which is crystallized from methylene chloride-methanol to yield the title compound, M.P. 237–239° C., $\nu_{max}^{CHCl_3}$ 3386, 3210, 1665, 1606 cm.$^{-1}$

EXAMPLE 21

Mixed anhydride of 17-methyl-3-oxoandrost-4-en-17β-carboxylic acid and carbonic acid monoethyl ester (39)

To 120 g. of 17-methyl-3-oxoandrost-4-ene-17β-carboxylic acid, described by Hs. H. Gunehard, et al., cited above, in 1 l. of THF is added 34 ml. of triethylamine with stirring. The solution is cooled in an ice bath and 21 ml. of ethyl chloroformate is added dropwise over a period of 10 min. After stirring for 1.5 hr. at room temperature, about one-half of the solvent is removed under reduced pressure, ether is added, and the suspension filtered. Concentration of the filtrate and dilution with petroleum ether yields the title compound as a pale yellow solid, M.P. 119–122° C., $\nu_{max}^{CHCl_3}$ 1805, 1745, 1660, 1610 cm.$^{-1}$ Chromatography of the material in the filtrate on silica gel yields additional product.

EXAMPLE 22

17-methyl-3-oxoandrost-4-en-17β-isocyanate (41)

A mixture of 10 g. of sodium azide and 20 g. of natural zeolite (Molecular Sieves) in 50 ml. of chlorobenzene is stirred and heated under reflux for 1.75 hr. The mixed anhydride of 17-methyl-3-oxoandrost-4-ene-17β-carboxylic acid and carbonic acid monoethyl ester (5.0 g.), prepared as described in Example 21, is then added in small portions and the mixture is stirred vigorously and heated under reflux overnight. After filtration, the solution is evaporated to dryness and the residual oil is chromatographed on silica gel. The material eluted with ether-benzene 1:9 is crystallized from methylene chloride-hexane to yield the title compound, M.P. 136–138° C., $[\alpha]_D^{dioxane}$+110°, $\nu_{max}^{CHCl_3}$ 2270, 1662, 1614 cm.$^{-1}$

EXAMPLE 23

N-(17-methyl-3-oxoandrost-4-en-17β-yl)-formamide (37)

After removing 8 ml. of solvent by distillation from a mixture of formic acid (97–100%) and 80 ml. of benzene, 8.0 g. of 17-methyl-3-oxoandrost-4-en-17β-isocyanate, prepared as described in Example 22, is added. The solution is heated under reflux under nitrogen for 4 hr., cooled, and washed successively with water, 5% NaOH, and water. The solid residue obtained on drying and evaporation is crystallized from methylene chloride-methanol and then from methylene chloride-benzene to yield the title compound, identical with the product obtained in Example 20.

EXAMPLE 24

17-methyl - 3 - oxoandrost-4-en-17β-isocarbonitrile (4, Z=CH$_3$, Q=H, and the linkages at positions 1,2 and 6,7 are saturated)

By following the procedure of Example 14 or 15 but replacing N-(3-oxoandrost-4-en-17β-yl)formamide or N-(17-methyl-3-oxoandrost-4-en-17β-yl)formamide, respectively, with an equimolar amount of N-(3β-formyloxy-17-methylandrost-5-en-17β-yl)formamide, prepared as described in Example 19, 3β-formyloxy-17-methylandrost-5-en-17β-isocarbonitrile, $\nu_{max}^{CHCl_3}$ 2140, 1715, 1180 cm.$^{-1}$ is obtained.

The latter compound (1.1 g.) is dissolved in 10 ml. of methanol saturated with potassium carbonate. After standing for 2 hr., the solution is concentrated and diluted with water. The precipitated product is filtered through a small column of silica gel (elution with ether-benzene 5:95). Crystallization of the eluate from methylene chloride-hexane yields 3β-hydroxy-17-methylandrost-5-en-17β-isocarbonitrile, M.P. 153–155° C., $[\alpha]_D^{dioxane}$ —42°.

Oxidation of the latter compound according to the method of G. I. Poos, et al., cited above, gives the title compound, identical with the product obtained in Example 15.

EXAMPLE 25

17-methyl-3-oxoandrosta - 1,4 - diene-17β-carbonitrile (2, X=H and the linkage at position 6,7 is saturated)

A mixture of 1.25 g. of 17-methyl-3-oxoandrost-4-ene-17β-carbonitrile, prepared as described in Example 4, and 1.01 g. of dichlorodicyanoquinone in 20 ml. of dioxane is heated under reflux under nitrogen for 18 hr. After cooling, the precipitated dihydroquinone is filtered, the filtrate is concentrated to dryness and the residue is dissolved in benzene-ether 1:1. The solution is washed alternately with 5% aqueous sodium carbonate solution and with water until no more color can be removed. The crude product obtained after drying and removal of solvent is chromatographed on silica gel. Elution with benzene-ether 95:5 gives the title compound, M.P. 143–144° C.

$\lambda_{max.}^{EtOH}$ 242 nm. $\epsilon = 14,100$ after one crystallization from methylene chloride-hexane.

By replacing 17-methyl-3-oxoandrost-4-ene-17β-carbonitrile in the above procedure with an equimolar amount of 6α,17 - dimethyl-3-oxoandrost-4-en-17β-carbonitrile, prepared as described in Example 7,
6α-fluoro-17-methyl-3-oxoandrost-4-ene-17β-carbonitrile, prepared as described in Example 9,
6α-chloro-17-methyl-3-oxoandrost-4-ene-17β-carbonitrile, prepared as described in Example 9,
6α-bromo-17-methyl-3-oxoandrost-4-ene-17β-carbonitrile, prepared as described in Example 9,
17-methyl-3-oxoandrost-4-ene-17β-carboxaldehyde, prepared as described in Example 11,
6α,17-dimethyl-3-oxoandrost-4-ene-17β-carboxaldehyde, prepared as described in Example 12,
6α-fluoro-17-methyl-3-oxoandrost-4-ene-17β-carboxaldehyde, prepared as described in Example 13,
6α-chloro-17-methyl-3-oxoandrost-4-ene-17β-carboxaldehyde, prepared as described in Example 13,
6α-bromo-17-methyl-3-oxoandrost-4-ene-17β-carboxaldehyde, prepared as described in Example 13,
N-(3-oxoandrost-4-en-17β-yl)formamide, described by J. Joska and F. Sorm, cited above, or
N-(17-methyl-3-oxoandrost-4-en-17β-yl)formamide prepared as described in Examples 20, 23 and 24, there are obtained,
    6α,17-dimethyl-3-oxoandrosta-1,4-diene-17β-carbonitrile,
    6α-fluoro-17-methyl-3-oxoandrosta-1,4-diene-17β-carbonitrile,
    6α-chloro-17-methyl-3-oxoandrosta-1,4-diene-17β-carbonitrile,
    6α-bromo-17-methyl-3-oxoandrosta-1,4-diene-17β-carbonitrile,
    17-methyl-3-oxoandrosta-1,4-diene-17β-carboxaldehyde,
    6α,17-dimethyl-3-oxoandrosta-1,4-diene-17β-carboxaldehyde,
    6α-fluoro-17-methyl-3-oxoandrosta-1,4-diene-17β-carboxaldehyde,
    6α-chloro-17-methyl-3-oxoandrosta-1,4-diene-17β-carboxaldehyde,
    6α-bromo-17-methyl-3-oxoandrosta-1,4-diene-17β-carboxaldehyde,
    N-(3-oxoandrosta-1,4-dien-17β-yl)formamide, and
    N-(17-methyl-3-oxoandrosta-1,4-diene-17β-yl)formamide, respectively.

EXAMPLE 26

6α,17-dimethyl-3-oxoandrosta-4,6-diene-17β-carbonitrile (2, X=CH₃ and the linkage at position 1,2 is saturated)

A mixture of 2.0 g. of 6α,17-dimethyl-3-oxoandrost-4-ene-17β-carbonitrile, prepared as described in Example 7, and 1.6 g. of chloranil in 60 ml. of isobutanol is heated under reflux overnight. Extraction with ether followed by washing of the extract with dilute sodium hydroxide solution and water, drying, and evaporation yields the title compound, $\lambda_{max.}^{EtOH}$ 288 nm. ($\epsilon = 25,000$)

By replacing 6α,17 - dimethyl-3-oxoandrost-4-ene-17β-carbonitrile in the above procedure with an equimolar amount of 17-methyl-3-oxoandrost-4-ene-17β-carbonitrile, prepared as described in Example 4,
17-methyl-3-oxoandrost-4-ene-17β-carboxaldehyde, prepared as described in Example 11,
6α,17-dimethyl-3-oxoandrost-4-ene-17β-carboxaldehyde, prepared as described in Example 12,
N-(3-oxoandrost-4-en-17β-yl)formamide, described by J. Joska and F. Sorm, cited above, or
N-(17-methyl-3-oxoandrost-4-en-17β-yl)formamide, prepared as described in Examples 20, 23 and 24, there are obtained,
    17-methyl-3-oxoandrosta-4,6-diene-17β-carbonitrile,
    17-methyl-3-oxoandrosta-4,6-diene-17β-carboxaldehyde,
    6α,17-dimethyl-3-oxoandrosta-4,6-diene-17β-carboxaldehyde,
    N-(3-oxoandrosta-4,6-dien-17β-yl)formamide, and
    N-(17-methyl-3-oxoandrosta-4,6-diene-17β-yl)formamide, respectively.

EXAMPLE 27

6-chloro - 17 - methyl-3-oxoandrosta-4,6-diene-17β-carbonitrile (2, X=Cl and the linkage at position 1,2 is saturated)

To a solution of 1.5 g. of 17-methyl-3-oxoandrosta-4,6-diene-17β-carbonitrile, prepared as described in Example 26, in 50 ml. of methylene chloride is added 50 ml. of 0.5 N monoperphthalic acid in ether. After standing at room temperature for three days the solution is washed with saturated aqueous sodium bicarbonate solution and with water,, dried, and evaporated. The resulting 6α,7α-epoxide is purified by chromatography on alumina. A solution of 0.8 g. of the 6α,7α-epoxide in 15 ml. of acetic acid is saturated with the anhydrous hydrohalic acid, hydrogen chloride, and kept at room temperature for 4 hr. The product obtained by pouring the solution into ice-water is purified by chromatography on alumina to yield the title compound, $\lambda_{max.}^{EtOH}$ 286 nm. ($\epsilon = 23,000$)

In the same manner but replacing hydrogen chloride with a equivalent amount of hydrogen bromide, 6-bromo-17-methyl-3-oxoandrosta-4,6-diene-17β-carbonitrile is obtained.

In the same manner except that before treating the solution of the 6α,7α-epoxide in acetic acid with anhydrous hydrogen chloride, said solution is first saturated with anhydrous hydrofluoric acid and allowed to stand at room temperature for 4 hr., 6-fluoro-17-methyl-3-oxoandrosta-4,6-diene-17β-carbonitrile is obtained.

EXAMPLE 28

By following the procedure of Example 27 but replacing 17-methyl-3-oxoandrosta-4,6-diene - 17β - carbonitrile with equimolar amounts of 17-methyl-3-oxoandrosta-4,6-diene-17β-carboxaldehyde, or N-(3-oxoandrosta-4,6-dien-17β-yl)formamide, or N-(17-methyl-3-oxoandrosta - 4,6- dien-17β-yl)formamide, all prepared as described in Example 26, and using the appropriate hydrohalic acid, hydrogen chloride or hydrogen bromide, there are obtained, 6 - chloro-17-methyl-3-oxoandrosta-4,6-diene-17β-carboxaldehyde, 6-bromo-17-methyl - 3 - oxoandrosta-4,6-diene-17β-carboxyaldehyde, N-(6-chloro-3-oxoandrosta-4,6-dien-17β-yl)formamide, $\lambda_{max.}^{EtOH}$ 285 nm. ($\epsilon$=23,000)

N-(6-chloro-17-methyl-3-oxoandrosta - 4,6 - dien-17β-yl) formamide, $\lambda_{max.}^{EtOH}$ 286 nm. ($\epsilon$=23,500)

N-(6-bromo - 3 - oxoandrosta-4,6-dien-17β-yl)formamide, and N-(6-bromo - 17 - methyl-3-oxoandrosta-4,6-dien-17β-yl)formamide, respectively.

By following the procedure of Example 27, but replacing 17-methyl-3-oxoandrosta-4,6-dien - 17β - carbonitrile with equimolar amounts of 17-methyl-3-oxoandrosta-4,6-diene-17β-carboxaldehyde, or N-(3-oxoandrosta-4,6-dien-17β-yl)formamide, or N-(17-methyl-3-oxoandrosta - 4,6-dien-17β-yl)formamide, and before treating the solution of the resulting 6α,7α-epoxide in acetic acid with anhydrous hydrogen chloride, saturating said solution first with anhydrous hydrogen fluoride and allowing the solution to stand for 4 hours, 6-fluoro-17-methyl-3-oxoandrosta-4,6-diene-17β-carboxaldehyde, N-(6-fluoro - 3 - oxoandrosta-4,6-dien-17β-yl)formamide, and N-(6-fluoro-17-methyl-3-oxoandrosta-4,6-dien-17β-yl)formamide, are obtained, respectively.

EXAMPLE 29

N-(3-methoxyestra-1,3,5(10)-trien-17β-yl)formamide (43)

A mixture of 50.0 g. of estrone methyl ether, 75 ml. of formic acid, and 38 ml. of formamide in 500 ml. of ethylene glycol is stirred and heated under reflux for 52 hr. Water (1 l.) is added dropwise and the suspension is cooled and filtered. The crude product is taken up in methylene chloride for drying and is crystallized from methylene chloride-hexane to yield the title compound, M.P. 244-246°, $\nu_{max.}^{CHCl_3}$ 3440, 3410, 1675 cm.$^{-1}$

EXAMPLE 30

3-oxoestra-4-en-17β-isocarbonitrile (5)

To 450 ml. of refluxing ammonia is added a mixture of 105 ml. of THF and 144 ml. of t-butanol followed by 31.5 g. of N-(3-methoxyestra-1,3,5(10)-trien-17β-yl) formamide, prepared as described in Example 29. Sodium (30 g.) is added in small pieces and the mixture is stirred for 5 hr. Methanol (80 ml.) is then added and the ammonia is allowed to evaporate overnight. Addition of water and filtration yields the 1,4-dihydro derivative 44 as a slightly brown solid, $\lambda_{max.}^{EtOH}$ 279 nm. ($\epsilon$=150)

A suspension of 20 g. of this material in a mixture of 400 ml. of methanol and 40 ml. of 10% hydrochloric acid is stirred for 1 hr., diluted with water, and filtered. Chromatography on silica gel eluting with 1:1 ethyl acetate-benzene, yields N - (3 - oxoestr-4-en-17β-yl)formamide (45) as a solid, $\nu_{max.}^{CHCl_3}$ 3430, 1680, 1660 and 1618 cm.$^{-1}$ To a stirred solution of 6.5 g. of this compound in 65 ml. of pyridine in a bath at −10° C. is added 4.4 g. of p-toluenesulfonyl chloride. After one hour at −10° C., water is added and the precipitated solid is filtered and chromatographed on silica gel. The material eluted with ether-benzene 5:95 is crystallized from methylene chloride-hexane to yield the title compound, M.P. 190-192° C., $[\alpha]_D^{dioxane}$ +112°, $\nu_{max.}^{CHCl_3}$ 2145, 1660, 1614 cm.$^{-1}$, $\lambda_{max.}^{EtOH}$ 239 nm. ($\epsilon$=18,460)

We claim:
1. A compound of the Formula I

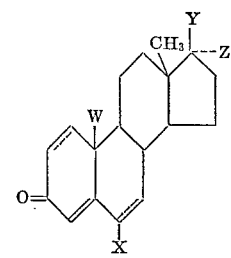

in which W is selected from the group consisting of hydrogen and methyl, and is methyl when a double bond is present at position 1,2; X is selected from the group consisting of hydrogen, methyl, fluorine, chlorine, and bromine; Y is selected from the group consisting of carbonitrile, carboxaldehyde, and isocarbonitrile; Z is selected from the group consisting of hydrogen and methyl, and is methyl when Y is carbonitrile or carboxaldehyde; and the dotted lines at positions 1,2 and 6,7 represent optional double bonds, providing that when W is hydrogen, each of X and Z is hydrogen, Y is isocarbonitrile and a double bond is absent at position 1,2.

2. 17-methyl-3-oxoandrost-4-ene-17β - carbonitrile, as claimed in claim 1.

3. 6α,17-dimethyl-3-oxoandrost-4 - ene - 17β - carbonitrile, as claimed in claim 1.

4. 6α - fluoro-17-methyl-3-oxoandrost-4-ene-17β-carbonitrile, as claimed in claim 1.

5. 17-methyl-3-oxoandrost-4-ene-17β - carboxaldehyde, as claimed in claim 1.

6. 6α,17-dimethyl-3-oxoandrost-4 - ene - 17β - carboxaldehyde, as claimed in claim 1.

7. 6α-fluoro-17-methyl-3-oxoandrost-4-ene - 17β - carboxaldehyde, as claimed in claim 1.

8. 3-oxoandrost-4-en-17β-isocarbonitrile, as claimed in claim 1.

9. 17-methyl-3-oxoandrost-4-en-17β-isocarbonitrile, as claimed in claim 1.

10. 17-methyl-3-oxoandrosta-1,4-dien - 17β - isocarbonitrile, as claimed in claim 1.

11. 17-methyl-3-oxoandrosta-1,4-diene - 17β - carbonitrile, as claimed in claim 1.

12. 6α,17-dimethyl-3-oxoandrosta - 4,6 - diene - 17β-carbonitrile, as claimed in claim 1.

13. 6-chloro-17-methyl - 3 - oxoandrosta-4,6-diene-17β-carbonitrile, as claimed in claim 1.

14. 3-oxoestr - 4 - en-17β-isocarbonitrile, as claimed in claim 1.

15. 6-chloro-3-oxoandrosta-4,6 - dien - 17β - isocarbonitrile, as claimed in claim 1.

16. 6-chloro-17-methyl-3-oxoandrosta-4,6 - dien - 17β-isocarbonitrile, as claimed in claim 1.

17. 3β-hydroxy-17-methylandrost-5-ene - 17β - carbonitrile.

18. 3β-hydroxy-17-methylandrost-5-en-17β - isocyanate formate.

19. N-(17-methyl-3-oxoandrost-4-en-17β - yl) - formamide.

20. 3β-hydroxy-17-methylandrost - 5 - ene - 17β - carbonyl azide formate.

21. 17-methyl-3-oxoandrost-4-en-17β-isocyanate.

22. 3β-hydroxy-17-methylandrost - 5 - en - 17β - isocarbonitrile.

23. N-(6-chloro-3-oxoandrosta - 4,6 - dien - 17β - yl) formamide.

24. N-(6-chloro-17-methyl-3-oxoandrosta - 4,6 - dien-17β-yl)-formamide.

25. A process for preparing 3β-hydroxy-17-methylandrost-5-ene-17β-carbonyl azide formate which comprises treating 3β-hydroxy-17-methylandrost - 5 - ene-17β-carboxylic acid chloride formate with triethylammonium azide at a temperature at or below room temperature for a period of time of from five minutes to three hours, and isolating said first-named compound.

No references cited.

ELBERT L. ROBERTS, Primary Examiner

U.S. Cl. X.R.

260—239.55, 397.4, 397.3, 397.5